United States Patent
Matsuura

(10) Patent No.: US 8,687,030 B2
(45) Date of Patent: Apr. 1, 2014

(54) EXPOSING DEVICE, METHOD OF MANUFACTURING THE SAME, AND IMAGE FORMING APPARATUS

(75) Inventor: Taizo Matsuura, Aichi-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 448 days.

(21) Appl. No.: 12/548,043

(22) Filed: Aug. 26, 2009

(65) Prior Publication Data

US 2010/0054812 A1 Mar. 4, 2010

(30) Foreign Application Priority Data

Aug. 26, 2008 (JP) ................................ 2008-216569

(51) Int. Cl.
*B41J 2/385* (2006.01)
*G03G 13/04* (2006.01)
*B41J 15/14* (2006.01)
*B41J 27/00* (2006.01)
*B41J 2/435* (2006.01)
*H01L 21/00* (2006.01)

(52) U.S. Cl.
USPC ........... 347/138; 347/242; 347/245; 347/257; 347/263; 438/22; 438/26; 438/28; 438/48; 438/51; 438/64; 438/106; 438/118; 438/119

(58) Field of Classification Search
USPC ........... 347/242, 138, 245, 257, 263; 438/22, 438/26, 28, 48, 51, 64, 106, 118, 119
See application file for complete search history.

(56) References Cited

U.S. PATENT DOCUMENTS

| | | | |
|---|---|---|---|
| 6,461,883 B1* | 10/2002 | Mine et al. | 438/22 |
| 6,995,782 B2* | 2/2006 | Oda et al. | 347/138 |
| 7,061,518 B2* | 6/2006 | Ueda et al. | 347/242 |

(Continued)

FOREIGN PATENT DOCUMENTS

| | | | |
|---|---|---|---|
| JP | 02038058 A | * | 2/1990 |
| JP | 03-250810 | | 11/1991 |

(Continued)

OTHER PUBLICATIONS

Notice of Reasons for Rejection for corresponding Japanese Patent Application No. 2008-216569 mailed Jun. 15, 2010.

*Primary Examiner* — Laura Martin
*Assistant Examiner* — Jeremy Bishop
(74) *Attorney, Agent, or Firm* — Banner & Witcoff, Ltd.

(57) ABSTRACT

There is provided an exposing device which includes an elongated optical head in which a plurality of light emitting portions are arranged, and a supporting member to which the optical head is adhered. The optical head and the supporting member are adhered by a first adhesive, and a second adhesive of which a modulus of elasticity after curing is lower than that of the first adhesive. The second adhesive is applied in a second adhesive area which is located at a boundary between the optical head and the supporting member and which is longer, in a longitudinal direction of the optical head, than a first adhesive area which is located at the boundary and to which the first adhesive is applied.

12 Claims, 6 Drawing Sheets

(56) References Cited

U.S. PATENT DOCUMENTS

| | | | |
|---|---|---|---|
| 7,187,501 B2 * | 3/2007 | Wakisaka | 359/622 |
| 7,274,514 B2 * | 9/2007 | Uematsu | 359/654 |
| 7,485,496 B2 * | 2/2009 | Chien et al. | 438/122 |
| 7,697,022 B2 * | 4/2010 | Gomi | 347/241 |
| 2005/0001896 A1 | 1/2005 | Wakisaka | |
| 2005/0006025 A1 * | 1/2005 | Frei et al. | 156/314 |
| 2007/0195677 A1 * | 8/2007 | Yamamoto | 369/112.28 |
| 2010/0020301 A1 * | 1/2010 | Sugiyama et al. | 355/67 |

FOREIGN PATENT DOCUMENTS

| | | | |
|---|---|---|---|
| JP | 04-141679 | | 5/1992 |
| JP | 07164663 A | * | 6/1995 |
| JP | 2000-233545 | | 8/2000 |
| JP | 2003-103828 | | 4/2003 |
| JP | 2004-213040 | | 7/2004 |
| JP | 2006056065 A | * | 3/2006 |

* cited by examiner

EXPOSING DEVICE, METHOD OF MANUFACTURING THE SAME, AND IMAGE FORMING APPARATUS

CROSS REFERENCE TO RELATED APPLICATION

The present application claims priority from Japanese Patent Application No. 2008-216569, filed on Aug. 26, 2008, the disclosure of which is incorporated herein by reference in its entirety.

BACKGROUND OF THE INVENTION

1. Field of the Invention

The present invention relates to an exposing device including an elongated optical head in which light emitting portions each of which emits light are arranged, a method of manufacturing the exposing device, and an image forming apparatus including the exposing device.

2. Description of the Related Art

In general, as an exposing device which exposes a photoconductive body to be used in an image forming apparatus such as a printer, a unit in which an LED head (an optical head) having an elongated shape in which light emitting portions such as LEDs (light emitting diodes) are arranged is fixed to a supporting member has hitherto been known. A method of fixing the optical head (an exposing optical system) to the supporting member by an adhesive has been known.

Incidentally, since the above mentioned optical head is arranged near the photoconductive body in an image forming apparatus, it is susceptible to have an impact at the time of attaching or detaching (mounting or dismounting) the photoconductive body or a developer unit which supplies a developer to the photoconductive body. Therefore, as an adhesive for fixing the optical head to the supporting member, an adhesive which has a predetermined elasticity after hardening, for absorbing the shock is sometimes used.

SUMMARY OF THE INVENTION

However, in a case in which the optical head is adhered to the supporting member by using an adhesive having an elasticity after hardening, when the supporting member or the optical head undergoes a linear expansion due to heat, it is difficult to predict a degree of a position shift of the optical head with respect to the photoconductive body. Therefore, it is not possible to regulate the position shift within given design limit.

In view of the abovementioned circumstances, an object of the present invention is to provide an exposing device in which it is possible to regulate the position shift of the optical head within given design limit when the optical head is adhered to the supporting member.

According to a first aspect of the present invention, there is provided an exposing device including an optical head which has an elongated shape and in which a plurality of light emitting portions each emitting the light are arranged; and a supporting member which supports the optical head and to which the optical head is adhered, wherein the optical head and the supporting member are adhered by a first adhesive, and a second adhesive of which a modulus of elasticity after curing is lower than that of the first adhesive, and the second adhesive is applied in a second adhesive area which is located at a boundary between the optical head and the supporting member and which is longer, in a longitudinal direction of the optical head, than a first adhesive area which is located at the boundary and to which the first adhesive is applied.

According to the first aspect of the present invention, since it is possible to determine a position by the first adhesive such that the optical head does not move with respect to the supporting member, it is possible to regulate a positional shift of the optical head within given design limit. Moreover, it is possible to absorb an inevitable change in dimensions due to an impact on the optical head and a change in temperature of the optical head, by the second adhesive which is applied over a wider range (width) in the longitudinal direction of the optical head than the first adhesive, because the coefficient of elasticity after hardening of the second adhesive is lower than that the first adhesive.

According to a second aspect of the present invention, there is provided a method of manufacturing exposing device which includes an optical head which has an elongated shape and in which a plurality of light emitting portions each emits the light is arranged, and a supporting member which supports the optical head and to which the optical head is adhered, the exposing device comprising:

applying a first adhesive to a first area of one of the optical head and the supporting member to adhere the optical head and the supporting member, and applying a second adhesive to a second area located in a space between the optical head and the supporting member to adhere the optical head and the supporting member such that the second area is longer than the first area in a longitudinal direction of the optical head, the second adhesive having a modulus of elasticity after curing which is lower than that of the first adhesive.

According to such method of manufacturing exposing device, firstly, the optical head and the supporting member are adhered by applying the first adhesive. Therefore, it is possible to determine a position such that the optical head does not move with respect to the supporting member, and it is possible to regulate a positional shift (a shift in a position) of the optical head within given design limit. Next, since the second adhesive is used for adhering, it becomes possible to absorb an inevitable change in dimensions due to an impact on the optical head and a change in temperature of the optical head.

According to an image forming apparatus according to the third aspect of the present invention, since it is possible to determine the position of the optical head by the first adhesive such that the optical head does not move with respect to the supporting member, it is possible to regulate the positional shift of the optical head within given design limit. Moreover, it is possible to absorb an inevitable change in dimensions due to an impact on the optical head and a change in temperature of the optical head, by the second adhesive. Accordingly, it is possible to improve a quality of an image which is formed.

DETAILED DESCRIPTION OF THE PREFERRED EMBODIMENTS

Overall Structure of Color Printer

Next, an embodiment of the present invention will be described below in detail while referring to the accompanying diagrams.

In the following description, directions are defined based on a user who uses the color printer. In other words, in FIG. 1, a left side is defined as a 'frontward' side (a frontward direction), a right side is defined as a 'rearward' side (a rearward direction), and an upper and lower direction is defined as a 'vertical' direction (up and down direction). Further, a front side and a back side in a normal direction of the paper surface in FIG. 1 are defined as a right side and a left side, respectively.

Figure 1:
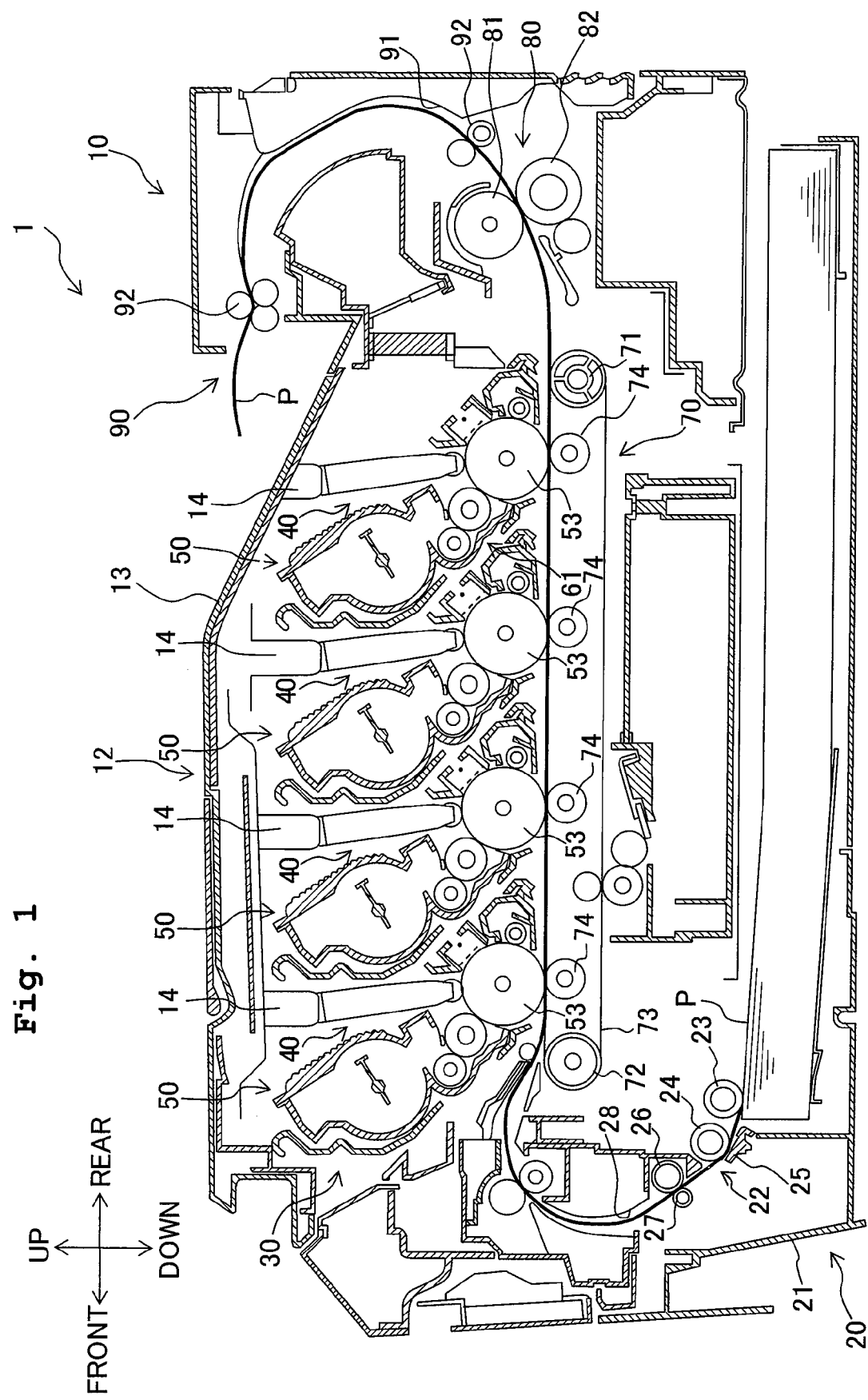
FIG. 1 is a cross-sectional view showing an overall structure of a color printer as an example of an image forming apparatus in which an exposing device according to the present invention is used.

As shown in FIG. 1, a color printer 1, in a body casing 10, includes a paper feeding section 20 which supplies a paper P, an image forming section 30 which forms an image on the paper P which is fed by the paper feeding section 20, and a paper discharge section 90 which discharges the paper P having the image formed thereon.

A top cover 12 which is pivotable (which is openable) up and down around a pivot shaft (not shown in the diagram) provided at a rear side, is provided at an upper portion of the body casing 10. An upper surface of the top cover 12 is a paper discharge tray 13 which accumulates papers P discharged from the body casing 10, and a lower surface of the top cover 12 is provided with a plurality of LED supporting portions 14 which hold an LED unit 40 (an exposing device).

The paper feeding section 20 includes a paper feeding tray 21 which is provided at a lower portion inside the body casing 10, and which is detachably mounted on the body casing 10, and a paper supplying mechanism 22 which supplies the papers P from the paper feeding tray 21 to the image forming section 30. The paper supplying mechanism 22 is provided at a front side of the paper feeding tray 21, and includes mainly a feeding roller 23, a separating roller 24, and a separating pad 25.

In the paper feeding section 20 structured in such manner, the papers P in the paper feeding tray 21 are sent upward upon being separated one-by-one by the paper supplying mechanism 22. Paper dust on the paper P is removed when the paper P passes between a paper-dust removing roller 26 and a pinch roller 27. After the paper dust is removed, the paper P passes through a paper transporting path 28, and a direction of paper is reversed rearward, and the paper P is supplied to the image forming section 30.

The image forming section 30 includes mainly four LED units 40 as an example of exposing devices, four process cartridges 50, a transfer unit 70, and a fixing unit 80.

The LED units 40 are arranged at an upper side of photoconductive drums 53 (photosensitive drums, photoconductive bodies) to face them, and are arranged to expose a surface of the photoconductive drums 53. Each of the LED unit 40 is fixed to the top cover 12 via the LED supporting portions 14. Therefore, the LED unit 40 is movable to a drawn-away position from an exposing position at which the photoconductive drum 53 is exposed when the top cover 12 rotates upward. A detail structure of the LED unit 40 will be described later.

Figure 2:
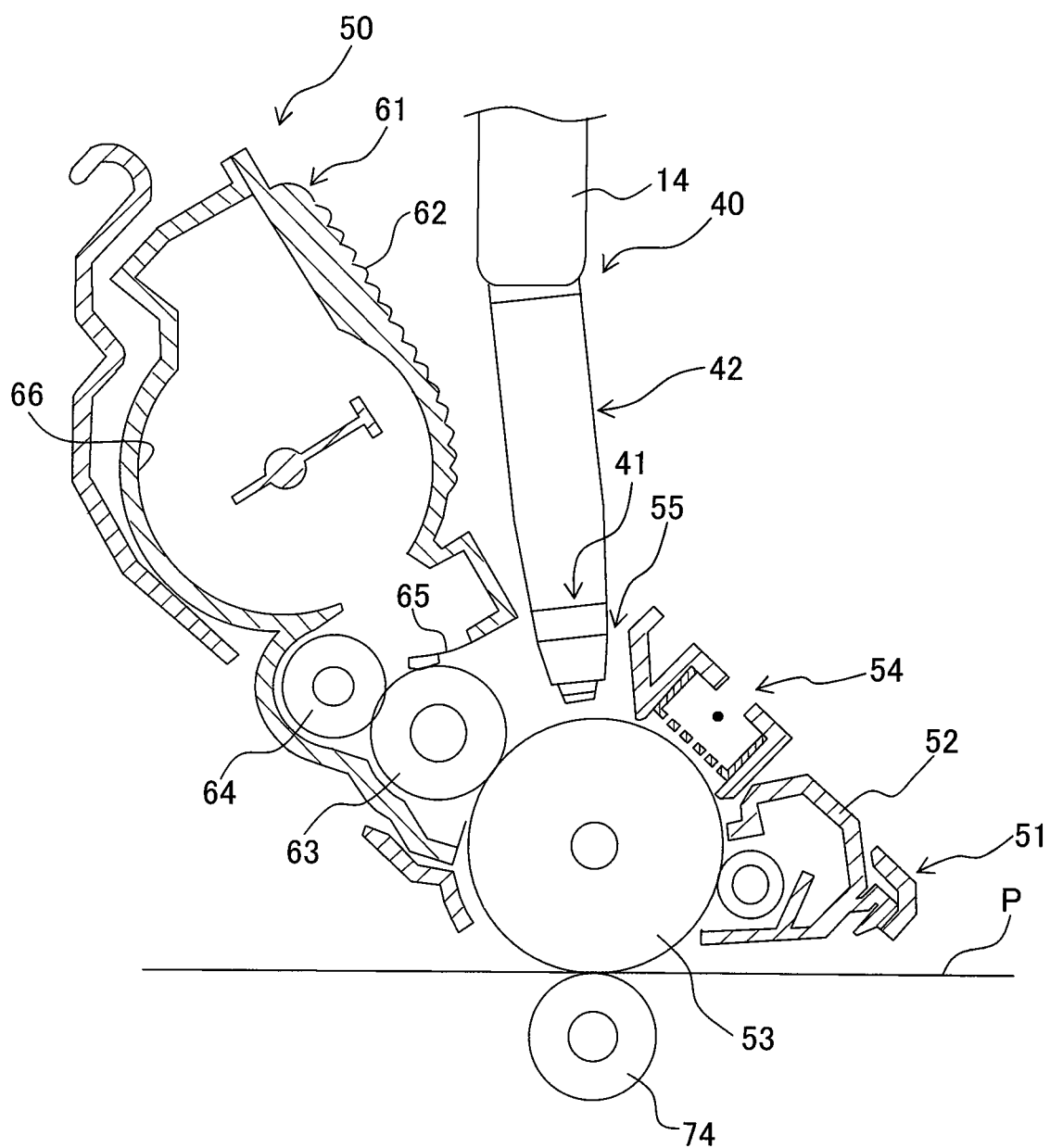
FIG. 2 is an enlarged view of a process cartridge.

The process cartridges 50 are arranged side-by-side in a frontward and rearward direction, between the top cover 12 and the paper feeding section 20, and includes a drum unit 51, and a developing unit 61 which is detachably mounted with respect to the drum unit 51 as shown in FIG. 2. Each of the process cartridges 50 has a same structure, and only a color of toner accommodated in a toner accommodating portion 66 of the developing unit 61 is different.

The drum unit 51 includes mainly a drum case 52, the photoconductive drum 53, and a charger 54. The developing unit 61 is mounted on the drum case 52, and an exposing hole 55 through which the photoconductive drum 53 is visible from outside is formed in the drum case 52. The LED unit 40 is inserted through the exposing hole 55, at an upper side of the photoconductive drum 53. The developing unit 61 includes mainly, a developing case (a developer case) 62, a developing roller 63, a supply roller 64, and a layer-thickness regulating blade 65, and has a toner accommodating portion 66 which accommodates toner (a developer).

As shown in FIG. 1, the transfer unit 70 is provided between the paper feeding section 20 and the process cartridges 50, and includes mainly, a drive roller 71, a driven roller 72, a transporting belt 73, a transfer roller 74, and a cleaning section 75.

The drive roller 71 and the driven roller 72 are arranged in parallel, to be separated apart in the frontward and rearward direction, and the transporting belt 73 which is an endless belt is put around the drive roller 71 and the driven roller 72. A surface on an outer side of the transporting belt 73 makes a contact with the photoconductive drum 53, and four transfer rollers 74 are arranged at an inner side of the transporting belt 73, facing the photoconductive drums 53 such that the transporting belt 73 is pinched between the photoconductive drums 53 and the transfer rollers 74. A transfer bias is applied to the transfer rollers 74 at the time of transfer.

The cleaning section 75 is arranged at a lower side of the transporting belt 73. The cleaning section 75 removes toner adhered to the transporting belt 73 to flick off the removed toner to a toner storage portion 76 arranged at a lower side thereof.

The fixing unit 80 is arranged at a rearward side of the process cartridges 50 and the transfer unit 70, and includes a heating roller 81, and a pressurizing roller 82 which is arranged face-to-face with the heating roller 81, and which pressurizes the heating roller 81.

In the image forming apparatus 30, firstly, the surface of each of the photoconductive drums 53 is charged uniformly by the charger 45, and after charging, the surface of each of the photoconductive drums 53 is exposed by light emitted from one of the LED units 40. Accordingly, an electric potential of a portion which is exposed is decreased, and an electrostatic latent image based on image data is formed on each of the photoconductive drum 53.

Moreover, the toner in the toner accommodating portion 66 is supplied to the developing roller 63 by rotation of the supply roller 64, and enters between the developing roller 63 and the layer-thickness regulating blade 65 by the rotation of the developing roller 63. Then, the toner is carried on the developing roller 63 as a thin layer having a constant (uniform) thickness. The toner carried on the developing roller 63 is supplied from the developing roller 63 to the electrostatic latent image on the photoconductive drum 53. Accordingly, the electrostatic latent image on the photoconductive drum 53 becomes a visible image, and a toner image is formed.

Thereafter, when the paper P supplied onto the transporting belt 73 passes between the photoconductive drums 53 and the transfer rollers 74 arranged at the inner side of the transporting belt 73, the toner images formed on the photoconductive drums 53 are transferred upon being superimposed one after the other on the paper P. Moreover, when the paper P passes between the heating roller 81 and the pressurizing roller 82, the toner images transferred on to the paper P are fixed by heating.

The paper discharge section 90 includes mainly, a paper-discharge side transporting path 91 which is extended upward from an exit of the fixing unit 80 and which is formed to change the direction frontward, and a plurality of transporting rollers 92 which transport the paper P. The paper P on which the toner image is fixed by the thermal heating is transported to the paper-discharge side transporting path 91 by the transporting rollers 92. Then, the paper is discharged to an outside of the body casing 10 to be accumulated in the paper discharge tray 13.

<Structure of LED Unit>

Next, a detail structure of the LED unit 40 (exposing device) will be described below.

Figure 3:
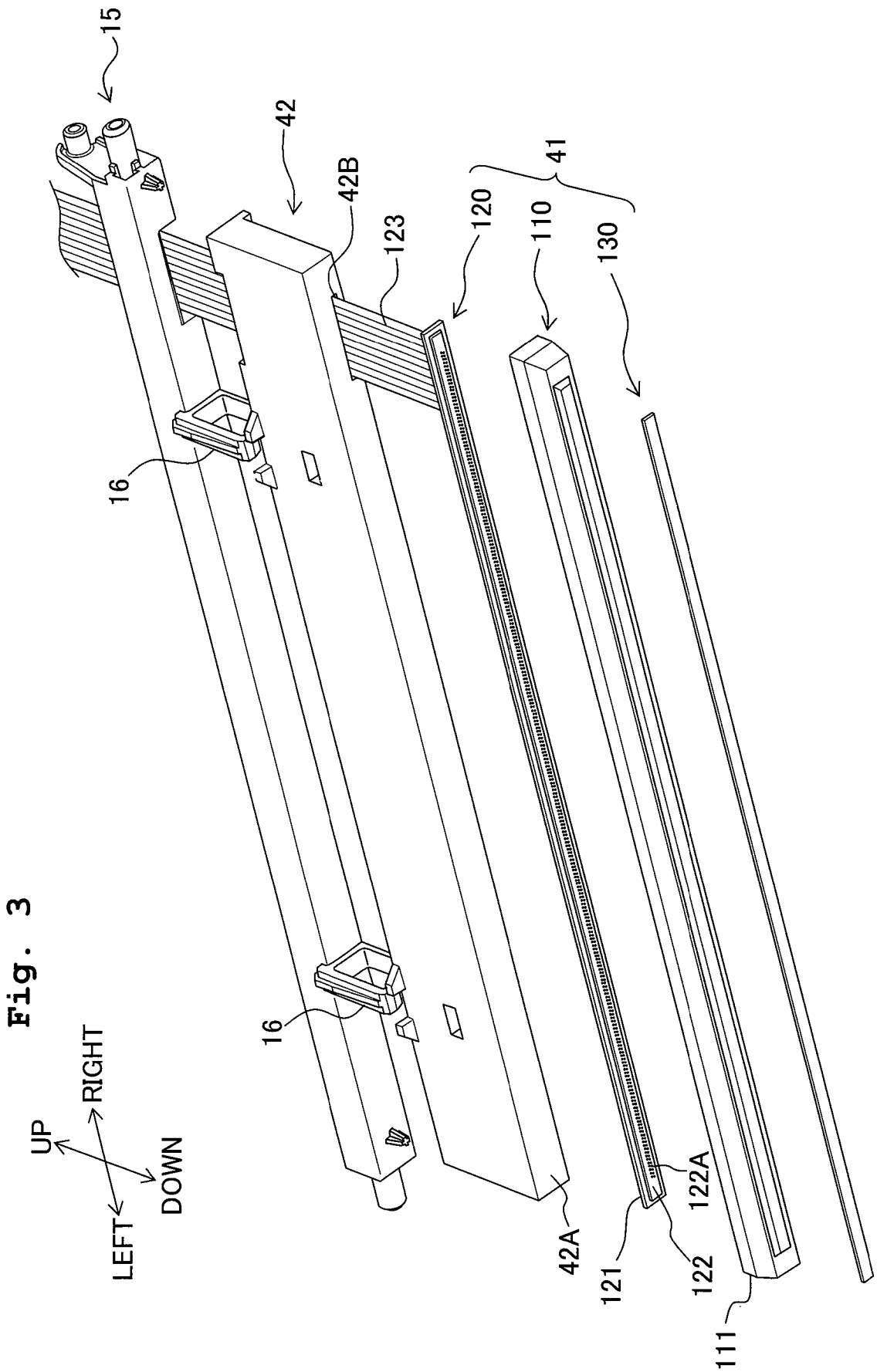
FIG. 3 is an exploded perspective view of an LED unit.
Figure 4:
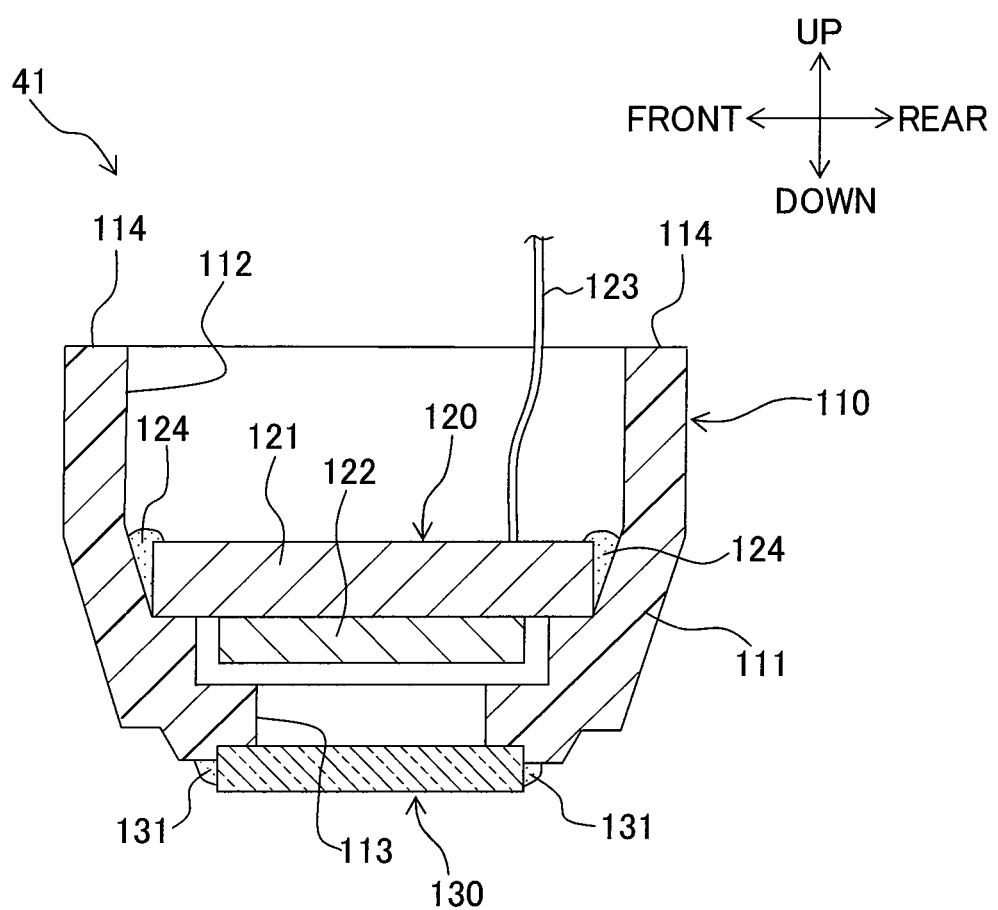
FIG. 4 is a cross-sectional view of an LED head.

As shown in FIG. 2, each of the LED units 40 includes mainly, an LED head 41 as an example of an optical head, and a supporting member 42 to which the LED head 41 is adhered. As shown in FIGS. 3 and 4, the LED head 41 includes mainly, an LED case 110 as an example of a frame member, an LED circuit board 120, and a lens array 130.

Figure 5:
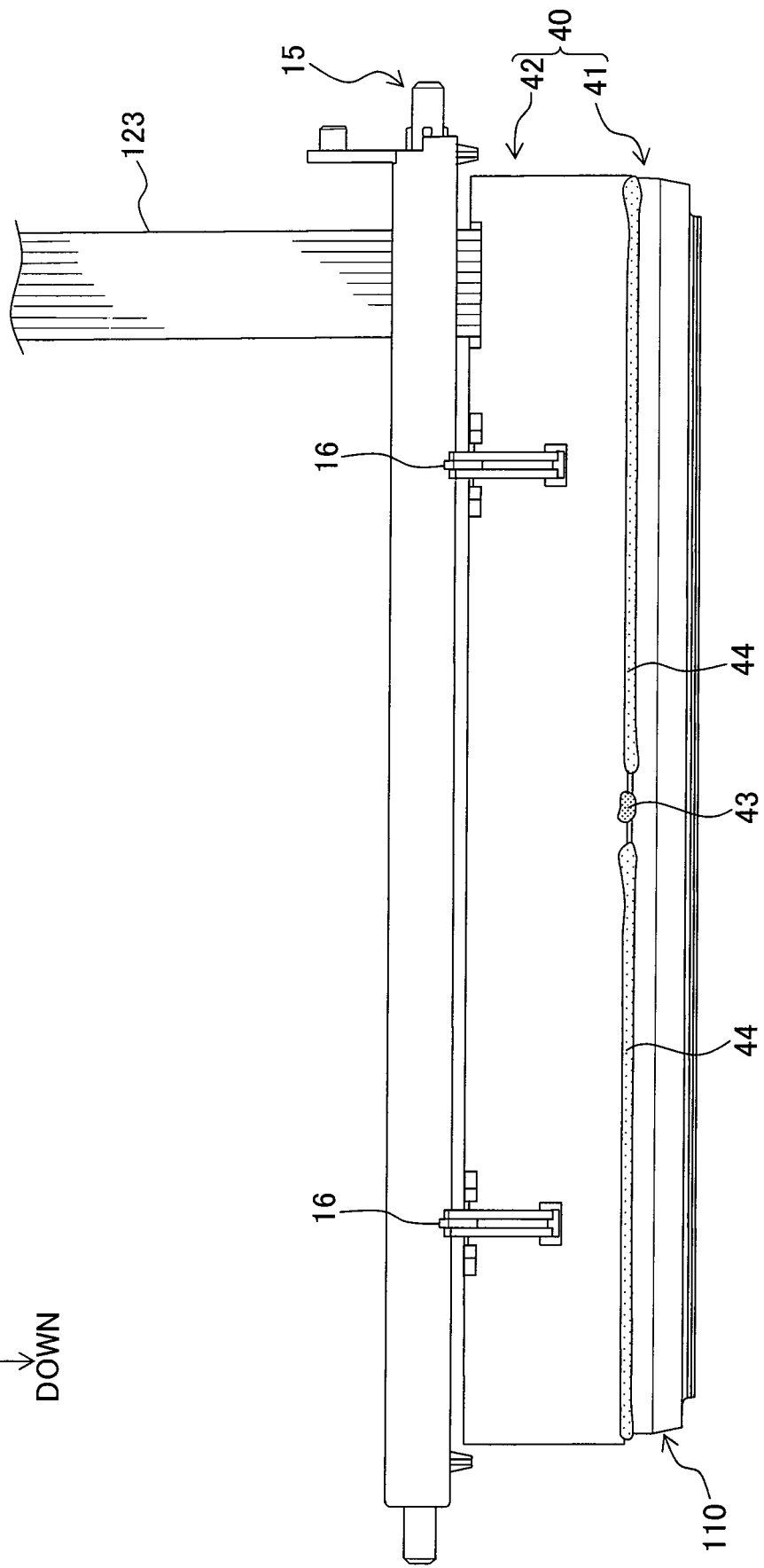
FIG. 5 is a front view of the LED unit.

The LED case 110 is a casing which supports a light emitting portion (an LED element 122A), and which is adhered to the supporting member 42 by adhesive (a first adhesive 43 and a second adhesive 44. Refer to FIG. 5). The LED case 110 includes mainly a case body 111 which is made of resin and which is formed to have an elongated shape in a left-right direction.

The case body 111 has an upper opening 112 for installing the LED circuit board 120 at an upper portion, and has a lower opening 113 at a lower portion through which the light emitted from the LED array 122 passes. An upper surface of the case body 111 is an adhesive surface having a rectangular-frame shape, which is adhered to the supporting member 42 by the adhesive (the first adhesive 43 and the second adhesive 44).

Since the LED case 110 is a case which supports the LED circuit board 120 (LED element 122A) which is sought to be positioned highly accurately with respect to the photoconductive drum 53, it is desirable that a length of the LED case 110 does not change substantially by a change in a temperature. Consequently, it is desirable that the resin which forms the LED case 110 (case body 111) is a resin having a small (low) linear expansion coefficient. In the embodiment, a linear expansion coefficient of the case body 111 is smaller (lower) than that of the supporting member 42. In the embodiment, concretely, the supporting member 42 is formed of an ABS resin (linear expansion coefficient $8 \times 10^{-5}$ cm/cm/° C.), and the case body 111 is formed of a polycarbonate (linear expansion coefficient $2.5 \times 10^{-5}$ cm/cm/° C.) (including glass fiber). These resins which form the supporting member 42 and the case main body 111 are only examples, and the present invention is not restricted to these resins.

The LED circuit board 120 includes mainly a circuit board 121, the LED array 122 arranged on the circuit board 121, and a harness 123. The circuit board 121 is arranged inside the LED case 110 (upper opening 112) in a state of the LED array 122 facing downward, and is adhered to the case body 111 by an adhesive 124.

The LED array 122 is a hitherto known element in which the plurality of LED elements 122A as an example of light emitting portions is arranged. A plurality of the LED elements 122A are arranged along a longitudinal direction of the LED case 110. In FIG. 3, a structure in which two rows of LED elements 122A are arranged is shown. However, the LED elements 122A may be arranged in one row or in not less than three rows. The harness 123 is a wire member which is connected to a control section of the color printer 1, which is not shown in the diagram and which transmits an image based on image data to be printed, to the LED circuit board 120.

The lens array 130 is a hitherto known lens which forms light emitted from the LED array 122 (LED elements 122A) into an image on the surface (photosensitive surface) of the photoconductive drum 53. The lens array 130 is arranged adjusting with the lower opening 113 of the LED case 110, and is adhered to the case body 111 by an adhesive 131.

As shown in FIGS. 3 and 5, the supporting member 42 supports the LED head 41 adhered by an adhesive from upper side (from above). The supporting member 42 is formed of a resin, and a lower surface thereof is an adhesive surface 42A which is to be adhered to the LED head 41 (an adhesive surface 114 of the LED case 110) by the adhesive (the first adhesive 43 and the second adhesive 44). The supporting member 42 has a wire hole 42B at a right-end side, for passing the harness 123.

The supporting member 42 is installed on a connecting member (a coupling member) 15 via a link 16. Moreover, when the connecting member 15 is installed on the LED supporting portion 14 of the top cover 12, the supporting member 42 (the LED unit 40) is installed on the top cover 12.

As shown in FIG. 5, the LED head 41 (the LED case 110) and the supporting member 42 are adhered by the first adhesive 43 and the second adhesive 44.

Figure 6A:
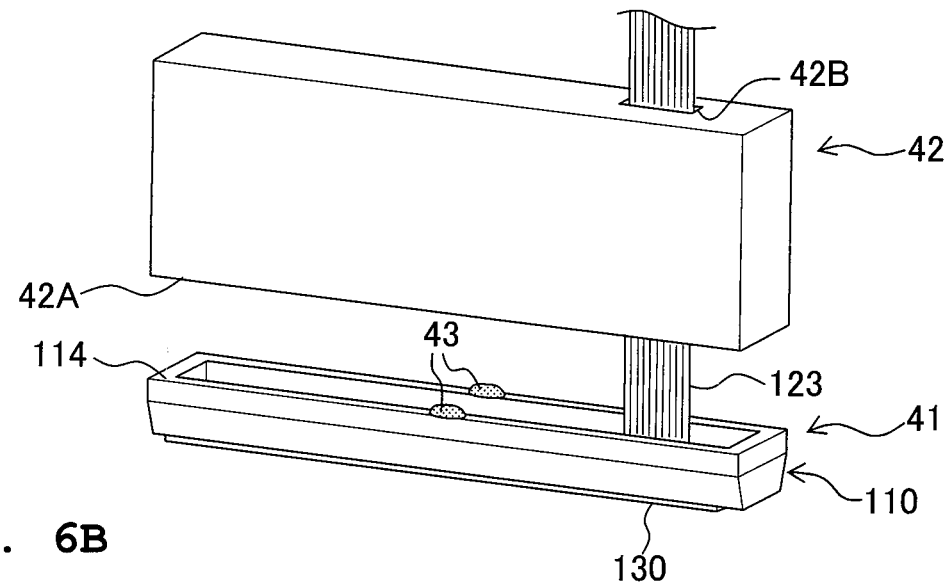
FIGS. 6A, 6B, and 6C are schematic diagrams for explaining the method of manufacturing the LED unit.

The first adhesive 43 is a hitherto known photo-curable resin, and is applied in the form of dots, as a dot at a front and a dot at a back (refer to FIG. 6A), of a central portion in a longitudinal direction (left-right direction) of the LED head 41 (the adhesive surface 114). A photo-curable resin having a higher modulus of elasticity after hardening (curing) is used as the first adhesive 43. For example, it is possible to use a resin having a modulus of elasticity after hardening of about 1000 MPa.

The second adhesive 44 is a hitherto known photo-curable resin having elasticity after hardening, and is applied to both left and right sides of each first adhesive 43, over a wider range in left-right direction, than the first adhesive. Therefore, concretely, the second adhesive 44 is applied to be extended in the form of a line in the left-right direction. A photo-curable resin having a coefficient of elasticity after hardening lower than the coefficient of elasticity of the first adhesive is used as the second adhesive 44. For example, it is possible to use a resin having a modulus of elasticity after hardening in a range of about 0.01 MPa to 10 MPa. In the embodiment, concretely, the first adhesive 43 may be formed of an acryl ultraviolet-curing resin (Three Bond 3042B) having Young's modulus (modulus of longitudinal elasticity) after hardening of approximately 690 MPa, and the second adhesive 44 may be formed of an acryl ultraviolet-curing resin (Three Bond 3003) having Young's modulus after hardening of approximately 14 MPa. These materials forming the first adhesive 43 and the second adhesive 44 are just examples, and the present invention is not restricted to such materials.

<Method of Manufacturing LED Unit>

Next, a method of manufacturing the LED unit 40 will be described below. Firstly, as shown FIG. 6A, the LED head 41 in which the LED circuit board 120 and the lens array 130 are fixed to the LED case 110 is prepared. The first adhesive 43 is applied in the form of dots (points), one dot and another dot (total two dots) are located at a front side and a back side of portions of the LED case 110, the portions being located at the central portion in the longitudinal direction of the adhesive surface 114 of the LED case 110.

Figure 6B:
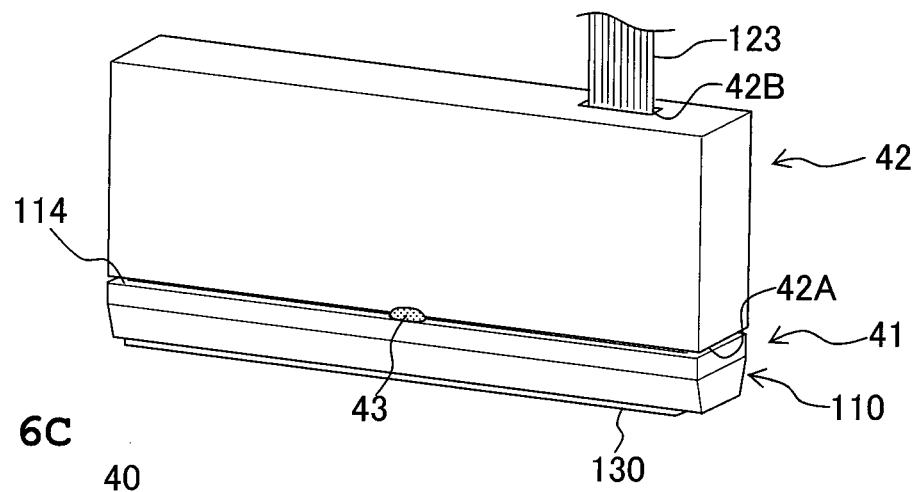

Next, the harness 123 is passed through the wire hole 42B of the supporting frame 42, and as shown in FIG. 6B, the LED case 110 and the supporting member 42 are adhered while positioning with each other. Moreover, the first adhesive 43 is cured by irradiating light by a light irradiating unit not shown in the diagram. Since the modulus of elasticity after hardening for the first adhesive 43 is high, deformation (of the first adhesive 43) due to an elastic force is small, and it is possible to fix the position of the LED head 41 with respect to the supporting member 42.

Figure 6C:
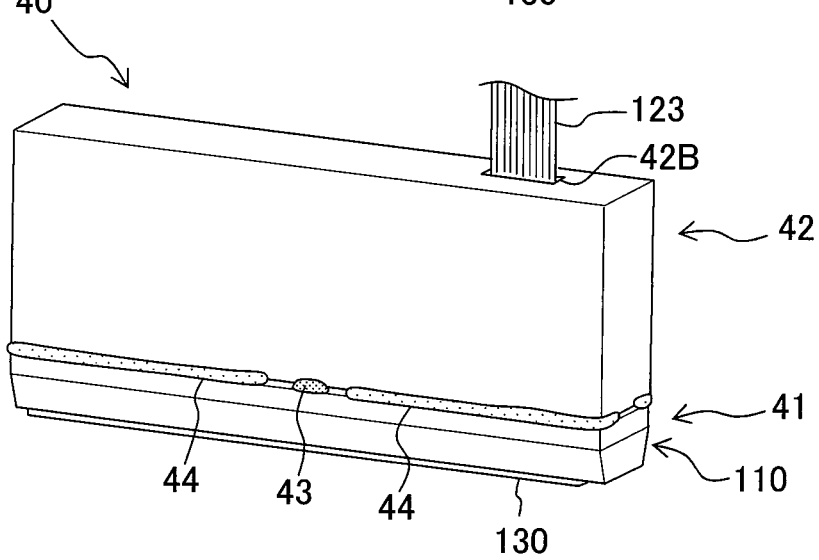

Next, as shown in FIG. 6C, in a gap (a space) between the LED case 110 and the supporting member 42, more elaborately, in a portion between the adhesive surface 114 of the LED case 110 and the adhesive surface 42A of the supporting member 42, the second adhesive 44 is applied to be permeated into the gap. For example, the second adhesive 44 may be filled between the adhesive surface 114 of the LED case 110 and the adhesive surface 42A of the supporting member 42 by using a wiper blade etc. Or, the second adhesive 44 may be charged between the adhesive surface 114 of the LED case 110 and the adhesive surface 42A of the supporting member 42 by using a glue dispenser etc. Concretely, the second adhesive 44 is applied at both left and right sides of the two portions in which the first adhesive 43 is adhered (total of four locations). The second adhesive 44 is applied over a wider range (in the form of a line) in the left-right direction than the first adhesive 43.

Finally, the second adhesive 44 is hardened by irradiating light by a light irradiating unit not shown in the diagram. Since the modulus of elasticity after curing for the second adhesive 44 is lower than the coefficient of elasticity after curing for the first adhesive 43, it is possible to deform the second adhesive 44 by the elasticity (the elastic force). Accordingly, at the time of using the LED unit 40, even when there is an impact on the LED head 41, or when the supporting member 42 or the LED case 110 is subjected to linear expansion due to a change in temperature, it is possible to absorb the impact or the change in dimensions.

Moreover, even when the second adhesive 44 contracts (shrinks) at the time of curing of the second adhesive 44, a force which distorts a positional relationship of the LED case 110 and the supporting member 42 due to the contraction is smaller than a fixing power of the first adhesive 43. Therefore, it is possible to maintain the positional relationship of the LED case 110 and the supporting member 42 which is determined by the first adhesive 43.

As shown in FIG. 5, the LED unit 40 is installed on the connecting member 15 via the link 16, and furthermore, as shown in FIG. 1, the LED unit 40 is installed on the top cover 12 via the LED supporting portion 14.

Accordingly, it is possible to achieve the following effect in the embodiment. Since the LED head 41 (LED case 110) and the supporting member 42 are adhered by the first adhesive 43 and the second adhesive 44, it is possible to fix the position of the LED head 41 with respect to the supporting member 42, by the first adhesive 43. Accordingly, it is possible to regulate a shift in the position of the LED head 41 with respect to the supporting member 42 within given design limit.

Moreover, since the second adhesive 44 is applied over a wider range in the longitudinal direction of the LED head 41 than the first adhesive 43, and since the modulus of elasticity after hardening of the second adhesive 44 is lower than the coefficient of elasticity after hardening of the first adhesive 43, it is possible to absorb the impact on the LED head 41, and an inevitable change in dimensions of the supporting member 42 and the LED case 110 due to the change in temperature.

Furthermore, since it is possible to distribute stress of the impact on and the change in the dimensions of the first adhesive, it is possible to suppress exfoliating of the first adhesive 43 from the adhesive surfaces 114 and 42A by the second adhesive having elasticity after hardening. Accordingly, it is possible to fix sustainably the position of the LED head 41 with respect to the supporting member 42.

Moreover, the method of manufacturing the LED unit 40 of the embodiment includes a step of adhering the LED head 41 and the supporting member 42 by applying the first adhesive 43 at a plurality of locations on the LED head 41 (adhesive surface 114), and a step of adhering by applying the second adhesive at a plurality of locations in the gap between the LED head 41 and the supporting member 42, over a wider range in the longitudinal direction than the first adhesive 43. Accordingly, since the LED head 41 and the supporting member 42 are adhered by applying the first adhesive 43 first of all, it is possible to fix the position of the LED head 41 with respect to the supporting member 42, and to regulate the shift in the position of the LED head 41 within given design limit. Next, since the LED head 41 and the supporting member 42 are adhered by applying the second adhesive 44, it is possible to absorb the stress of the impact on and the change in the dimensions of the LED head 41 and the first adhesive 43.

The first adhesive 43 is applied to the central portion in the longitudinal direction of the LED head 41. Accordingly, when the second adhesive 44 contracts at the time of hardening the second adhesive 44, or when there is a change in dimensions of the supporting member 42 or the LED case 110 due to the change in temperature, it is possible to let the stress exerted on the first adhesive 43 to be bilaterally symmetric. In other words, since it is possible to make small a load exerted on the first adhesive 43, it is possible to suppress a shift in the positional relationship of the LED case 110 and the supporting member 42.

Moreover, as compared to a case in which the first adhesive is applied to one end portion in the longitudinal direction, it is possible to make small an effect of the change in dimensions of the supporting member 42 or the LED case 110 due to the change in temperature. For example, it is assumed that there is an exposing device in which the first adhesive is applied to a central portion in the longitudinal direction and an exposing device in which the first adhesive is applied to one end portion in the longitudinal direction, and that a length of a frame member (an LED case) is extended only by the same length in the longitudinal direction due to the change in temperature. In this case, the change in dimensions at each end portion in the longitudinal direction of the former exposing device to which the first adhesive is applied to the central portion is substantially half of a change in dimensions of the other end portion in the longitudinal direction of the latter exposing device to which the first adhesive is applied to the one end portion. Accordingly, since it is possible to make small a positional shift of an optical head near an end portion thereof with respect to a photoconductive body, it is possible to make small an effect of the change in dimensions due to the change in temperature.

Since the first adhesive 43 is applied in the form of dots and the second adhesive 44 is applied in the form of lines, it is possible to secure an adhesive area between the LED case 110 and the supporting member 42 while further reducing the stress of the change in dimensions of and the impact on the first adhesive 43 after curing. Accordingly, it is possible to fix favorably the position of the LED head 14 with respect to the supporting member 2 while securing an adhesive force between the LED case 110 and the supporting member 42.

Since the linear expansion coefficient of the LED case 110 of the LED head 41 is smaller than that of the supporting member 42, the change in dimensions due to the change in temperature hardly occurs for the LED case 110, as compared to the change in dimensions due to the change in temperature for the supporting member 42. Accordingly, it is possible to secure a high positional accuracy for the photoconductive drum 53, and to improve an image quality in the color printer 1.

The embodiment of the present invention has been described above. However, the present invention is not restricted to the embodiment described above, and regarding a concrete structure, various modifications which fairly fall within the basic teachings herein set forth are possible.

In the embodiment, an example in which the first adhesive 43 is applied to the central portion in the longitudinal direction of the LED head 41 has been cited. However, the present invention is not restricted to this example, and the first adhesive 43 may be applied to an end portion in the longitudinal direction of the optical head. Moreover, in the embodiment described above, an example in which the first adhesive 43 is applied to one location at front side and another location at back side of the LED head (refer to FIG. 6A) has been cited. However, the present invention is not restricted to this, and the first adhesive 43 may be applied to a plurality of locations at each of the front side and the back side of the LED head, or may be applied to one location at one side of the LED head (for example the front side) and to a plurality of locations at the other side of the LED head (at the back side for example).

In the embodiment described above, an example in which the first adhesive 43 is applied in the form of dots, and the second adhesive is applied in the form of lines has been cited. However, the present invention is not restricted to this, and the first adhesive may applied in the form of lines (shape having a predetermined width in the longitudinal direction of the optical head). Moreover, the second adhesive 44 is not restricted to be applied in the form of a substantially straight line. For example, in FIG. 6C, (the second adhesive 44) may be applied continuously in the form of a substantial U-shape in a plan view, from the front side up to the back side.

In the embodiment described above, an example in which the first adhesive 43 is applied to two locations (plurality of locations) of the LED head 41 (adhesive surface 114) has been cited. However, the present invention is not restricted to this, and the arrangement may be made such that the first adhesive is applied to one location of the optical head. Moreover, in the embodiment described above, an example in which the second adhesive 44 is applied to four locations (plurality of locations) in the gap between the LED head 41 and the supporting member 42 has been cited. However, the present invention is not restricted to this, and the arrangement may be made such that the second adhesive is applied to one location in the gap between the optical head and the supporting member. Moreover, an arrangement may be made such that, one of the first adhesive and the second adhesive is applied to one location, and the other is applied to the plurality of locations.

In the embodiment described above, the photo-curable resin has been cited as an example of the first adhesive 43 and the second adhesive 44. However, the present invention is not restricted to this, and it is also possible to use an epoxy adhesive or a silicon adhesive. Moreover, the first adhesive and the second adhesive are not required to the adhesive of the same type, and one of the first adhesive and the second adhesive may be a photo-curable resin, and the other may be a silicon adhesive. As in the embodiment described above, it is possible to manufacture the exposing device easily, and to improve production efficiency by using a photo-curable resin as adhesive.

In the embodiment described above, the LED head 41 and the supporting member 42 are adhered by applying the first adhesive 43 to the LED head 41 (optical head). However, the present invention is not restricted to this, and the optical head and the supporting member may be adhered by applying the first adhesive to the supporting member.

In the embodiment described above, an example in which the adhesive surfaces 114 and 42A are flat surfaces has been cited. However, the present invention is not restricted to this. For example, a plurality of protrusions (protruding portions) may be formed on one of the adhesive surfaces, or on both the adhesive surfaces, directed toward the other adhesive surface, and the optical head and the supporting member may be adhered by applying the first adhesive to the protrusions. According to such structure, since a gap (a distance) between the optical head and the supporting member is secured assuredly in a portion in which the protrusions are not formed, it becomes easy to apply the second adhesive, and it is possible to secure an amount of the second adhesive to be applied. Accordingly, it is possible to absorb the impact and the change in dimensions while securing an adhesive force between the optical head and the supporting member.

As another arrangement for making it easy to apply the second adhesive, and to secure the amount of adhesive to be applied, for example, a recess (a notch) may be formed at an outer peripheral portion of the adhesive surface of at least one of the optical head and the supporting member. According to such arrangement, when the optical head and the supporting member are adhered by the first adhesive, it is possible to form a gap between the optical head and the supporting member by the recess.

In the embodiment described above, the LED element 122A has been indicated as an example of a light emitting portion. However, the present invention is not restricted to this, and an EL (electroluminescent) element or a fluorescent body (substance) may be used. Moreover, for forming an optical head in which light emitting portions are arranged, there may be one light source (one light emitting element). For example, one back light such as a fluorescent light and a plurality of optical shutters of liquid crystal elements or PLZT (Pb, La, Zr, and Ti) elements arranged in a row may be provided. In other words, it is possible to form an optical head in which light emitting portions are arranged by combining one light emitting element and the aligned optical shutters.

In the embodiment described above, the structure of the LED head 41 (optical head) and the supporting member 42 is an example. However, the present invention is not restricted to such structure. In other words, the structure and the shape of the optical head and the supporting member may be changed appropriately within a range which is fairly within the basic teachings herein set forth.

In the embodiment described above, an example in which, the exposing device (the LED unit 40) of the present invention is applied to the color printer 1 has been cited. However, the present invention is not restricted to this, and the present invention is also applicable to other image forming apparatuses such as a monochrome printer, a copy machine, and a multi-function device, and to measuring apparatuses, and testing apparatuses apart from the image forming apparatuses.

What is claimed is:

1. An exposing device which exposes an object with a light, comprising:
    an optical head which has an elongated shape and in which a plurality of light emitting portions configured to emit light are arranged; and
    a supporting member configured to support the optical head and to which the optical head is adhered,
    wherein the optical head and the supporting member are adhered by a first adhesive and a second adhesive, the second adhesive having a modulus of elasticity after curing that is lower than that of the first adhesive, and
    wherein the second adhesive is applied in a second adhesive area which is located at a boundary between the optical head and the supporting member and which is longer, in a longitudinal direction of the optical head, than a first adhesive area which is located at the boundary and to which the first adhesive is applied,
    wherein the second adhesive area is arranged at a circumference of the boundary between the optical head and the supporting member,
    wherein the second adhesive is exposed to an outside of the optical head and the supporting member at the boundary between the optical head and the supporting member, and
    wherein the first adhesive is in a form of a dot.

2. The exposing device according to claim 1, wherein the first adhesive area to which the first adhesive is applied is located at a central portion of the optical head in the longitudinal direction.

3. The exposing device according to claim 1, wherein the second adhesive is in a form of a line.

4. The exposing device according to claim 1, wherein the optical head includes a frame member which supports the light emitting portions and which is adhered to the supporting member by the first adhesive and the second adhesive, and
    wherein a linear expansion coefficient of the frame member is smaller than a linear expansion coefficient of the supporting member.

5. The exposing device according to claim 4, wherein both the frame member and the supporting member are formed of a resin material.

6. A method of manufacturing an exposing device which includes an optical head which has an elongated shape and in which a plurality of light emitting portions configured to emit light is arranged, and a supporting member which is configured to support the optical head and to which the optical head is adhered, the method comprising:
    applying a first adhesive to a first area of one of the optical head and the supporting member to adhere the optical head and the supporting member, and
    applying a second adhesive to a second area located in a space between the optical head and the supporting member to adhere the optical head and the supporting member such that the second area is longer than the first area in a longitudinal direction of the optical head, the second adhesive having a modulus of elasticity after curing which is lower than that of the first adhesive,
    wherein the second adhesive area is arranged at a circumference of the boundary between the optical head and the supporting member, and
    wherein the first adhesive is in a form of a dot.

7. The method of manufacturing an exposing device according to claim 6, wherein the first adhesive is applied to a central portion, of one of the optical head and the supporting member, in the longitudinal direction.

8. The method of manufacturing an exposing device according to claim 6, wherein the second adhesive is applied in a form of a line.

9. An image forming apparatus which is configured to form an image on an object, comprising:
    a transporting mechanism configured to transport the object;
    a photoconductive body;
    an exposing device which is configured to expose the photoconductive body to form the electrostatic latent image on the photoconductive body and which includes an elongated-shaped optical head in which a plurality of light emitting portions configured to emit light is arranged, and a supporting member to which the optical head is adhered;
    a developing unit configured to develop the electrostatic latent image formed on the photoconductive body to form a developed image;
    a transfer unit configured to transfer the developed image to the object; and
    a fixing unit configured to fix the image, transferred to the object, on the object,
    wherein in the exposing device, the optical head and the supporting member are adhered by a first adhesive and a second adhesive, the second adhesive having a modulus of elasticity after curing that is lower than that of the first adhesive,
    wherein the second adhesive is applied in a second adhesive area which is located at a boundary between the optical head and the supporting member and which is longer, in a longitudinal direction of the optical head, than a first adhesive area which is located at the boundary and to which the first adhesive is applied,
    wherein the second adhesive area is arranged at a circumference of the boundary between the optical head and the supporting member, and
    wherein the first adhesive is in a form of a dot.

10. The image forming apparatus according to claim 9, wherein the first adhesive area is located at a central portion of one of the optical head and the supporting member, in the longitudinal direction.

11. The image forming apparatus according to claim 9, wherein the second adhesive is in a form of a line.

12. The exposing device according to claim 1, wherein the first and second adhesives are photo-curable resins.

* * * * *